United States Patent
Widmann et al.

(10) Patent No.: US 6,947,091 B1
(45) Date of Patent: Sep. 20, 2005

(54) FOCUSSING AND FOCAL LENGTH ADJUSTING DEVICE FOR A VIDEO CAMERA

(75) Inventors: Holger Widmann, Bretten (DE); Michael Voegele, Kaempfelbach-Ersingen (DE); Ulrich Osterland, Knittlingen (DE)

(73) Assignee: Richard Wolf GmbH, Knittlingen (DE)

(*) Notice: Subject to any disclaimer, the term of this patent is extended or adjusted under 35 U.S.C. 154(b) by 849 days.

(21) Appl. No.: 09/594,306

(22) Filed: Jun. 15, 2000

(30) Foreign Application Priority Data

Jun. 15, 1999 (DE) ........................................ 199 27 129

(51) Int. Cl.[7] .......................... H04N 7/18; H04N 5/232
(52) U.S. Cl. .................... 348/345; 348/65; 348/240.99
(58) Field of Search ............... 348/65, 240.99, 348/240.1, 345, 349, 357, 347; 359/824, 696

(56) References Cited

U.S. PATENT DOCUMENTS

| | | | | |
|---|---|---|---|---|
| 4,894,579 A | * | 1/1990 | Higuchi et al. ............. 310/328 |
| 5,101,278 A | * | 3/1992 | Itsumi et al. ................ 348/357 |
| 5,148,502 A | | 9/1992 | Tsujiuchi et al. |
| 5,282,045 A | | 1/1994 | Mimura et al. |
| 5,349,408 A | | 9/1994 | Nomura et al. |
| 5,365,296 A | * | 11/1994 | Murakami et al. ............. 396/80 |
| 5,418,645 A | * | 5/1995 | Coath et al. ................. 359/676 |
| 5,490,015 A | * | 2/1996 | Umeyama et al. .......... 359/824 |
| 5,652,922 A | | 7/1997 | Kohno |
| 5,675,444 A | * | 10/1997 | Ueyama et al. ............. 359/824 |
| 5,686,960 A | * | 11/1997 | Sussman et al. .......... 348/218.1 |
| 6,501,505 B1 | * | 12/2002 | Kawamura et al. ...... 348/240.3 |
| 6,573,931 B1 | * | 6/2003 | Horii et al. ............ 348/211.14 |
| 6,727,949 B1 | * | 4/2004 | Saruwatari et al. ......... 348/349 |

FOREIGN PATENT DOCUMENTS

| | | |
|---|---|---|
| DE | 33 48 073 | 4/1984 |
| DE | 34 35 136 | 4/1985 |
| DE | 37 83 960 T2 | 1/1988 |
| DE | 689 10 352 | 9/1989 |
| DE | 691 26 731 T2 | 10/1991 |
| DE | 43 12 489 | 10/1993 |
| DE | 198 41 441 | 3/1999 |
| EP | 634 680 | 1/1995 |

* cited by examiner

Primary Examiner—Tuan Ho
Assistant Examiner—Rashawn N. Tillery
(74) Attorney, Agent, or Firm—Cohen, Pontani, Lieberman & Pavane

(57) ABSTRACT

A focussing and focal length adjusting device for an optical lens system in the camera head of an endoscope. This device includes a focussing device which has several piezoelectric bending actuators attached along and symmetrically to the optical axis of the focussing lens. The piezoelectric bending actuators are via in each case one joint member connected to a sleeve encompassing the focussing lens in a manner such that with voltage impingement bending movements carried out by the bending actuators are converted into a linear focussing movement for the focussing lens. Furthermore a zoom drive adjusting the focal length of a zoom lens system includes a stepper motor whose stepped rotation via a grooved roller and a pin linearly moved by the helical groove of this roller is converted into a linear movement of a zoom lens sleeve for the focal length adjustment. The activation of the stepper motor for the zoom operation, and the production of the focus adjusting signal for the piezoelectric actuators of the focussing device are effected during the vertical blanking interval of the video signal, this interval being extracted by an extraction circuit from the video signal and being led to a respective focussing circuit and a zoom control circuit in the form of a time window.

24 Claims, 3 Drawing Sheets

FOCUSSING AND FOCAL LENGTH ADJUSTING DEVICE FOR A VIDEO CAMERA

BACKGROUND OF THE INVENTION

1. Field of the Invention

The invention relates to a focussing and focal length adjusting device for a video camera, in particular for an optical lens system in an endoscopic video camera, with a drive device moved by at least one piezoelectric actuator, for a focussing lens of the lens system, with an automatic focussing circuit for producing a focus adjusting signal which can be supplied to the piezo electric actuator, and with an electromotoric zoom drive, connected to a zoom objective of the optical lens system, with a zoom control circuit which with a manually inputted zoom signal produces a focal length adjusting signal for the zoom drive.

2. Discussion of the Prior Art

Particularly with endoscopic applications with which the operating surgeon does away with an assistant guiding the camera and holds the camera himself or has it fixed by way of a mechanical holding arm, the automation of the frequent picture focussing readjustment means a significant handling improvement which permits the operating surgeon to concentrate more on the surgical or diagnostic activity. In endoscopy an autofocus may only be accepted when it reacts unnoticeable to the human eye, from which there results the demand that the used control system as well as the drive must be very quick and that such a drive, neither in the camera head nor in the cable to the camera controller, may cause disturbances of the picture signal.

Autofocussing devices in conventional video cameras are frequently realized by electric motors which drive a linearly guided focussing member via a spindle. A further usual movement transfer of electric motors is effected via a toothing on the circumference of a sleeve containing the focussing member, in order to rotorically move this. This rotational movement by way of a helical slot in the sleeve is converted into a translatory adjustment of the focussing sleeve. The use of electric motors in endoscopic camera heads often entails disturbances in the video picture which by way of the nature of the use may not be accepted. Furthermore electric motors may only be moved successively in one direction, and a jump-like movement to a certain target position is not possible with them. Thus with electric motors the demands of a rapid focus adjustment unnoticeable to the eye can only be fulfilled with difficulty.

From U.S. Pat. No. 5,490,015 there is known an automatic focussing device for a video endoscope which comprises a piezoelectric actuator for moving a focussing lens. This known focussing drive is based on the properties of a piezoelectric stack actuator, with which several platelet-shaped piezoelectric ceramic elements and intermediately lying electrode layers are stacked over one another and which extends jump-like with a suitable activation. The piezoelectric actuator positioned in a groove by a clamping device overcomes the sticking friction by way of a mechanical impulse which results from a jump-like extension. By way of this the actuator may slide into the groove and the focussing lens holder connected to the actuator may be moved over a short period of time. The successive repetition of this short movement section leads to a perceivable adjustment. The direction forwards or backwards with this is determined by the shape of the flanks of the activation voltage which is applied to the piezoelectric actuator. In order however to achieve an adequate adjusting path the piezoelectric actuator receives a sequence of voltage impulses within a certain space in time. These voltage impulses may in the video picture lead, to visible disturbances since a certain cross talking onto the video signal leads in the camera cable cannot be avoided. The same applies to the direct neighborhood of the control actuators to the sensitive camera head.

In the field of vario-objective control, i.e. for activation of a zoom objective of a camera there are known a series of drive systems. From U.S. Pat. No. 5,349,408 and U.S. Pat. No. 5,652,922 there are known motoric drive units for vario-objectives which use a synchronous motor or bush motor and for transmission use pinions, gearwheels and helix guides. For the application in standard video cameras this is a practical solution. In the field of endoscopic video cameras however by way of the operation of such electric motors disturbances in the video picture arise. Furthermore these electric motors are not suitable as drive units in video endoscopes on account of their mostly considerable space requirement.

BRIEF SUMMARY OF THE INVENTION

It is the object of the invention to specify a focussing and focal distance adjusting device for an optical lens system of a video camera, in particular for an endoscope, with which neither in the camera head nor in the cable to the camera controller are there caused disturbances of the picture signal. Furthermore as small and as light as possible drive for the focussing device is to be made possible which minimizes the occurring forces of the endoscope onto the body openings and which causes only a short focussing path and may satisfy the great demands, by way of this, on the resolution of the adjusting path of the focussing drive or of the transmission. Furthermore the drive provided for adjusting the zoom objective should be precise and not cause any noticeable shakings or picture distortions with the zoom operation.

One focussing and focal length adjusting device pursuant to the invention has a drive device moved by at least one piezoelectric actuator for a focussing lens of the lens system of the video camera. An automatic focussing circuit produces a focus adjusting signal which can be supplied to the piezoelectric actuator. An electromotor zoom drive is connected to a zoom objective of the optical lens system. A zoom control circuit produces a focal length adjusting signal for the zoom drive. An essential aspect of this device thus lies in the production, i.e. the detection and use of a time window on the basis of the extracted vertical synchronization impulse in the video signal. The time window is led to the focussing circuit and the zoom control circuit, wherein the focussing circuit leads back the produced focus adjusting signal to the piezoelectric actuator, and the zoom control circuit the focal length adjusting signal to the zoom drive, only within the vertical blanking interval indicated by the time window.

Since thus exclusively the time periods of e.g. 1.6 ms, in a cycle of 20 ms not influenced by the reading-out of the video picture data, in the television system according to CCIR or PAL-standard, are used for producing the focus adjusting signal for the focusing device and for producing the focal length adjusting signal for the zoom operation, picture disturbances caused by the interference of the video signal by activation currents may be eliminated.

The focussing device according to the invention uses for the movement of the focussing member piezoelectric bending actuators. Two or three strip-like bending actuators are positioned laterally parallel to the optical axis along the objective and for example are fixed by molding into a stationary part. If an electrical charge is supplied to them, the piezoelectric bending actuators are in the position of deflecting their non-fixed end. Via link members the produced movement is transmitted to a focussing sleeve enclosing the focussing lens. The direction of the movement, which with the bending actuator runs originally orthogonally to the optical axis of the system, by way of the inclination of the joint member is converted into a movement along the optical axis. The jump-like positioning prevents disturbing blurring phases, e.g. during starting procedures or great contrast changes. The speed of the piezoelectric actuator permits furthermore the use of the short time window between two video half-pictures for adjusting the focus.

With the stepper motor used according to the invention for the focal length adjusting device of the zoom lens system in each blanking interval in each case one step may be initiated. Via a grooved roller connected to the shaft of the stepper motor the rotor rotational movement via the pin connected to the zoom sleeve is converted into a linear axial movement of the zoom sleeve. This type of guiding is in comparison to the known combinations (pinion guiding, crown gear guide, helical guide) particularly low in play and friction. The thread length of the grooved roller corresponds exactly to the zoom path. By way of the pitch of the groove thread the desired zoom speed may be set. In the half step mode the stepper motor has a particularly great running smoothness, which is why this half-step mode is to be preferred.

BRIEF DESCRIPTION OF THE DRAWINGS

The invention is hereinafter described in more detail by way of embodiment examples shown in the drawing. There are shown.

DETAILED DESCRIPTION OF THE INVENTION

Figure 1:
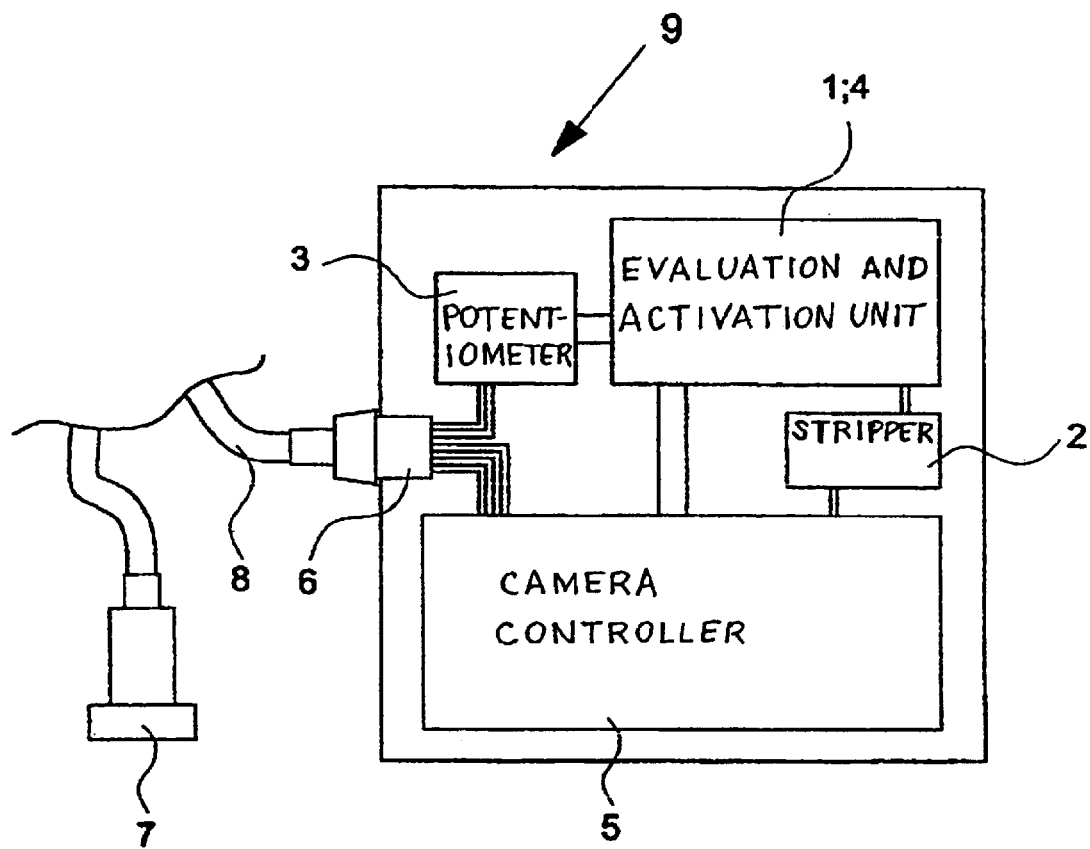
FIG. 1 schematically as a function block diagram shows a focussing circuit activating the focussing device according to the invention.

With the focussing circuit shown in FIG. 1 schematically as a function block diagram in a controller block 9 of an endoscopic camera, a unit 1 for evaluating the picture focus and outputting an in-focus value, a V-sync stripper 2, an electronic potentiometer 3, a unit 4 for activation of the potentiometer with a multi-bit signal, a video camera controller 5 and an interface 6 are unified to a connection cable 8 which leads to a camera head 7 in which the focussing drive device described further below and the electromotoric zoom drive are integrated.

The connection cable 8 between the camera head 7 and the controller block 9 may be a few meters long. The control leads of the drive for the focussing lens in the camera head 7 separate this cable 8 with the leads for the camera functions and the leads for the picture data. With this, as mentioned, the alternating amplitudes of the activation currents of the drives for the focussing lens would usually cause disturbances in the video signal. A disturbance-free activation of the drives in the camera head 7 may only be ensured when these drives are not activated or function at the same time as the picture data transmission. According to the invention the pause between the video half-pictures for this separation with respect to time is used. It is initiated by a clearly differentiatable rectangular impulse—the vertical synchronization impulse ($V_{sync}$) in the video signal. This rectangular impulse is used in order to determine the phase in which no picture data transfer occurs and the piezoelectric actuators of the focussing drive device as well as the stepper motor of the zoom drive may be supplied with voltage for changing their position.

With a passive method the picture focus, or a value for the degree of an in-focus position is evaluated in the unit 1. This value is processed further in the unit 4 which for example is designed as a micro-controller. The transferred value is compared to earlier values and from this comparison a new input value for the electronic potentiometer 3 is evaluated. This input value is transmitted to the electronic potentiometer 3 in a 17 bit format, wherein the activation of the potentiometer 3 with the new value is effected only after the transfer of the 17 bits. The last bit is only transmitted when by way of the front flank of the vertical synchronization impulse $V_{Sync}$ which is either obtainable as a direct signal from the camera electronics or is extracted by the V-Sync stripper 2 from the video signal, an authorization is reached. In this manner the resistance of the potentiometer is only changed with the beginning of the blanking signal. A voltage jump triggered by way of this, at the middle position of the later described piezoelectric bending actuators, permits a current flow from or to the piezoelectric bending actuators until the voltage defined by the potentiometer 3 fully is applied to the piezoelectric bending actuators. This process is effected also at the maximum deflection of the piezoelectric actuators from their zero position in less than 1.6 ms. Thus the complete adjustment of the drive device serving-the-focussing may take place within the vertical blanking interval, and thus in the video picture no disturbances may occur.

Figure 2:
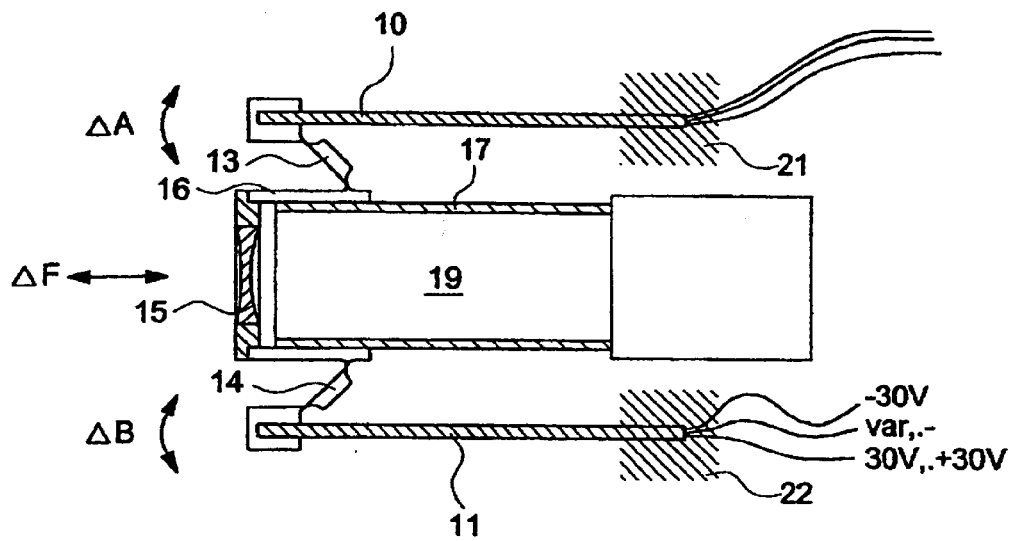
FIG. 2 schematically illustrates a longitudinal section through a first embodiment of the focussing device according to the invention.

In FIG. 2 which schematically shows a longitudinal section through a first embodiment using piezoelectric bending actuators, two parallel strip-like elongate piezoelectric bending actuators 10 and 11 are positioned symmetrically to the optical axis of an optical lens system 19 contained in a sleeve 17 and at their one end are fixed for example by molding in (fixing locations 21 and 22). When to these actuators 10, 11 as mentioned above, in the vertical blanking interval, there is supplied an electrical charge, the piezoelectric bending actuators 10, 11 are in the position, in this time interval, to deflect their non-fixed end shown on the left in FIG. 2 (arrows A and B). This deflection is transmitted via in each case one link member 13, 14 to an outer sleeve 16 carrying a focussing lens 15. The direction of the movement which originally ran orthogonally to the optical axis of the system is by way of the inclination of the connection element contained in the joint members 13, 14 converted into a movement ΔF along the optical axis.

In the embodiment shown in FIG. 2, the tilting of the focussing lens 15 is prevented by the linear guiding properties of two slidingly movable sleeves displaceable within one another, i.e. the inner sleeve 17 containing the lens system 19 and the outer sleeve 16 containing the focussing lens 15.

The piezoelectric bending actuators 10, 11 in FIG. 2, which are designed as bimorphous piezoelectric bending actuators, from the focussing circuit described above by way of FIG. 1, corresponding to the desired deflection obtain a variable voltage between −30 V and +30 V which is applied to their middle position while the outer electrodes are supplied with a static voltage of in each case −30 V and +30 V. The piezoelectric bending actuators 10, 11 are activated synchronously.

Figure 3:
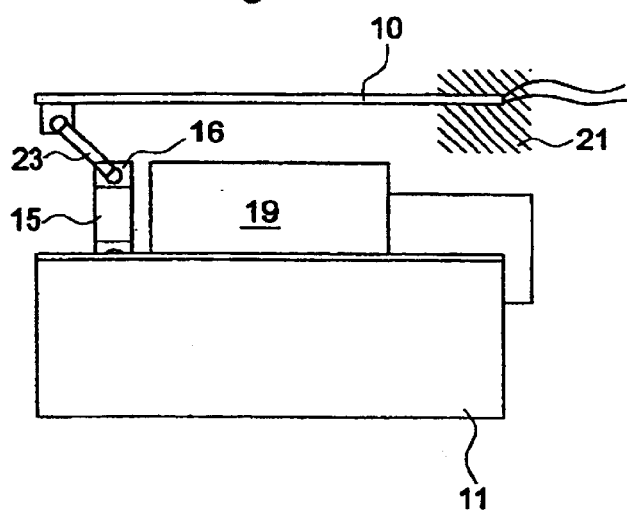
FIG. 3 schematically illustrates a longitudinal section through a second embodiment of the focussing device according to the invention.
Figure 4:
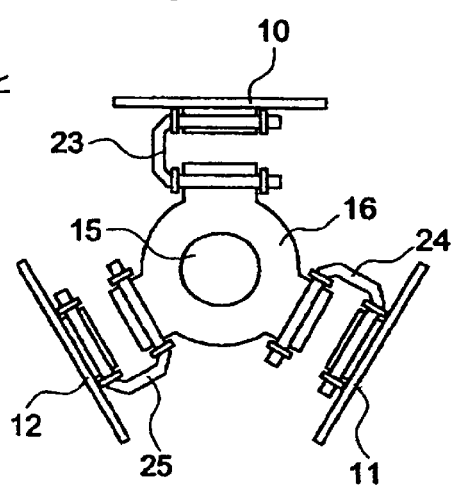
FIG. 4 is a schematic cross section through the second embodiment shown in FIG. 3, of the focussing device according to the invention.

In the FIGS. 3 and 4 which in each case show schematically a longitudinal section and a cross section through a second embodiment of a focussing device according to the invention equipped with piezoelectric bending actuators, three piezoelectric bending actuators 10, 11 and 12 are arranged parallel to and symmetrically to the optical axis of the focussing lens 15 in each case angularly displaced by 120°.

The redirection of the bending movement of the free end of the piezoelectric bending actuator 10, 11 and 12 is effected with this embodiment by the wire joints 23, 24 and 25 which are attached on the circumference of the focussing lens holder 16 at distances of 120°. By way of this type of suspension a linear guiding of the focussing lens 15 according to FIG. 2 may be done away with. Deflection differences of the three actuators 10, 11 and 12 may be compensated by activation.

It is yet to be mentioned that to the sleeve 17 containing the camera lens system 19 as usual there connects a recorder system with a CCD sensor or with a prism and three CCD sensors, and that this focussing device is arranged in the camera head (FIG. 1).

The enormous speed with which the deflection of the piezoelectric bending actuators 10, 11 and 12 with the embodiments shown in the FIGS. 2 to 4 may be realized opens up varying possibilities of providing the passive control, as is practiced in video technology, with more effective algorithms. The jump-like positioning prevents the disturbing unfocussed phases which otherwise occur during starting procedures with customary electromotoric autofocussing devices. By way of the speed of the actuators as mentioned, the time window, given by the vertical blanking interval, between two video half pictures may be used for focussing adjustment. In this manner with the focussing device according to the invention picture disturbances may be eliminated as they could arise by way of interferences of the video signal with the activation currents of the drive.

Figure 5:
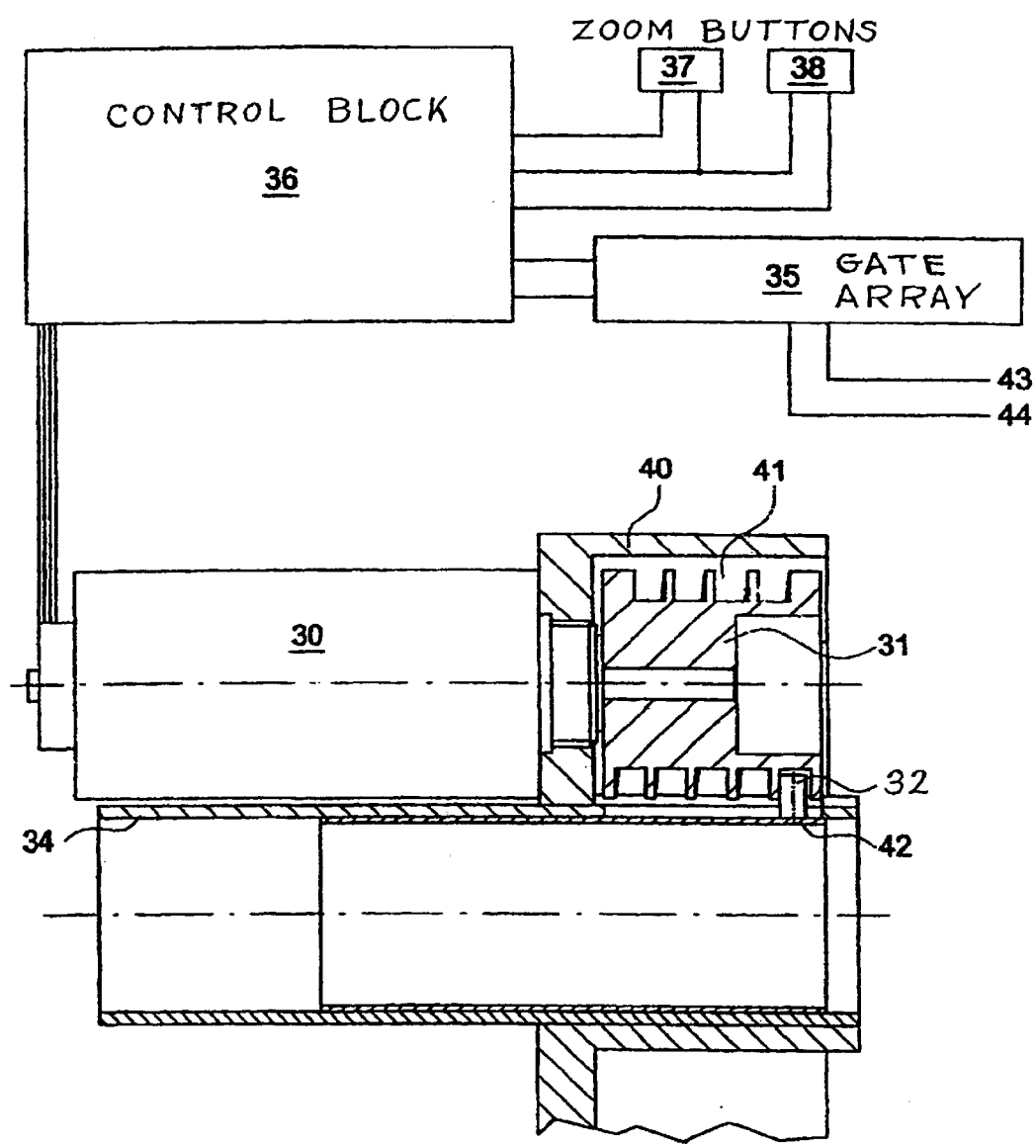
FIG. 5 schematically and in a longitudinal section illustrates an embodiment of a focal length adjusting device according to the invention in combination with a zoom control circuit represented as a function block diagram.

In FIG. 5 which schematically and in longitudinal section shows an embodiment of a focal length adjusting device according to the invention in combination with a zoom control circuit shown as a function block diagram, a stepper motor 30 which is fixed in a motor mounting 40 drives a grooved roller 31 with a helical groove 41. Via the grooved roller 31 the movement of the shaft of the stepper motor 30 is transmitted to a pin 32 which for its part is connected to the zoom sleeve 42 guided in an outer sleeve 34. The pin 32 transmits the axial force onto the zoom sleeve 33 and displaces this in the axial direction. This type of guiding in comparison to the known solutions is particularly low in play and friction. The motor mounting 40 also serves the centering and fixation of the outer sleeve 34.

The thread path of the grooved roller 31 seen axially corresponds exactly to the zoom path. Via the pitch of the groove thread 41 the desired zoom speed may be set. A further possibility of the adjusting may be effected via the operating mode of the stepper motor 30. In the half-step mode the angle increment is 9° which with a supply with a 50 Hz alternating voltage corresponds to a rotational speed of $1.25$ $s^{-1}$. However the half step mode distinguishes itself by a higher running smoothness of the stepper motor 30 which is why this mode is to be preferred.

The grooved roller 31 consists preferably of plastic, aluminum, titanium or another light metal. However also other materials of a higher density may be applied as long as the motor moment of the stepper motor 30 is high enough in order to overcome the moment of inertia of the grooved roller 31.

In the upper section of FIG. 5 in a block diagram manner there is shown a zoom control circuit which comprises a control block 36 connected to zoom buttons 37 and 38 and a programmable gate array 35 which obtains a video signal 43 and in particular with the use of color dividing prism systems delivers a signal 44 for "color shading". The control block 36 contains a motor driver and where appropriate a mains part.

The operation of the stepper motor 30 is effected in a manner that both its phases during the period of the actuation of the button 37 is permanently flown with current, thus also during the CCD blanking but the pole reversal of the phase current and thus the release of a step increment occur in each case synchronously with the beginning of the "blanking interval". During the duration of the "blanking interval" the rotor of the stepper motor 30 moves into its respective new position. This is effected in approx. 500 $\mu$s so that at the beginning of the CCD blanking after the "blanking interval" a change of the phase current no longer takes place and thus no disturbance of the video picture is caused. The current flow of the motor phases generally only during the blanking-free is not useful since the rotor of the motor 30 in this case tends to oscillate and by way of this would possibly execute undefined step increments.

The half-picture blanking frequency is 50 Hz and thus also the repeating frequency of the blanking-free time window, i.e. in the cycle of 20 ms as mentioned there is available a time window of 1.6 ms for the respective step element. With an angular increment of the motor 30 in the half step mode of 9° there results an angular speed of 50 $s^{-1} \times 9° = 450°/s$ and thus a rotational speed of $1.25$ $s^{-1}$. Via the pitch of the thread of the grooved roller 31 thus the adjusting speed of the zoom drive may be set. As mentioned it is also possible to operate the motor with the double frequency, i.e. to initiate two step increments per "blanking interval". By way of this there results double as high an adjusting speed.

By way of the video signal 43 and of the freely-programmable gate array 35, apart from the control of the motor driver in the block 36 likewise a signal 44 proportional to the respective zoom position may be produced for "color shading".

The invention is not limited by the embodiments described above which are presented as examples only but can be modified in various ways within the scope of protection defined by the appended patent claims.

What is claimed is:

1. A focussing and focal length adjusting device for an optical lens system in an endoscopic video camera, comprising:
   a drive device for a focussing lens of the lens system, the drive device comprising a focussing sleeve encompassing the focussing lens, the focussing lens having an optical axis;
   two parallel strip-like piezoelectric bending actuators arranged to lie opposite one another on both sides of the focussing sleeve symmetrically to and along the optical axis, a free end of each said actuator being connected to the focussing sleeve by a respective joint member;

an automatic focussing circuit for producing a focus adjusting signal which can be supplied to the piezoelectric actuators, the focussing circuit comprising a picture focussing acquisition device operative to acquire a degree of an in-focus position of the focussing lens, and a comparative device operative to compare the acquired degree of focussing with an earlier degree of focussing, the comparison producing an input signal for a voltage generator;

an electromotoric zoom drive connected to a zoom objective of the optical lens system; and a zoom control circuit which with a manually inputted zoom signal produces a focal length adjusting signal for the zoom drive, wherein from a vertical synchronous impulse ($V_{Sync}$), obtained as a direct signal from camera electronics or extracted from a video signal by way of an extraction circuit, a time window is produced which is supplied to the focussing circuit and the zoom control circuit, the focussing circuit sending the focus adjusting signal to the piezoelectric actuator of the drive device and the zoom control circuit, and the focal length adjusting signal to the zoom drive only within a vertical blanking interval provided by the time window, wherein the voltage generator produces a focusing voltage corresponding to a focusing lens position and synchronously applies the voltage to both bending actuators.

2. A device according to claim 1, wherein the voltage generator is an electronic potentiometer.

3. A device according to claim 2, wherein the focussing circuit comprises a microprocessor which produces the input signal for the electronic potentiometer as a multi-bit signal.

4. A device according to claim 1, and further comprising a sleeve containing optical components of the lens system, the sleeve being arranged within the focussing sleeve so as to be slidingly movable for linear guiding.

5. A device according to claim 1, wherein the joint members are plastic film joints.

6. A device according to claim 1, wherein the joint members are wire joints.

7. A device according to claim 1, wherein ends of the bending actuators lying opposite the free ends are fastened in an outer part fixing a head of the camera.

8. A focussing and focal length adjusting device for an optical lens system in an endoscopic video camera, comprising:

a drive device for a focusing lens of the lens system, the drive device comprising a focussing sleeve encompassing the focusing lens, the focusing lens having an optical axis;

three parallel strip-like piezoelectric bending actuators that are mutually angularly displaced by 120° and lie symmetrically to and along the optical axis at the sides of the focussing sleeve, a free end of each said actuator being connected to the focusing sleeve by a respective joint member;

an automatic focussing circuit for producing a focus adjusting signal which can be supplied to the piezoelectric actuators, the focussing circuit comprising a picture focussing acquisition device operative to acquire a degree of an in-focus position of the focussing lens, and a comparative device operative to compare the acquired degree of focussing with an earlier degree of focussing, the comparison producing an input signal for a voltage generator;

an electromotoric zoom drive connected to a zoom objective of the optical lens system; and a zoom control circuit which with a manually inputted zoom signal produces a focal length adjusting signal for the zoom drive, wherein from a vertical synchronous impulse ($V_{Sync}$), obtained as a direct signal from camera electronics or extracted from a video signal by way of an extraction circuit, a time window is produced which is supplied to the focussing circuit and the zoom control circuit, the focussing circuit sending the focus adjusting signal to the piezoelectric actuator of the drive device and the zoom control circuit, and the focal length adjusting signal to the zoom drive only within a vertical blanking interval provided by the time window, wherein the voltage generator produces a focusing voltage corresponding to a focusing lens position and synchronously applies the voltage to all three bending actuators.

9. A device according to claim 8, wherein the voltage generator is an electronic potentiometer.

10. A device according to claim 9, wherein the focussing circuit comprises a microprocessor which produces the input signal for the electronic potentiometer as a multi-bit signal.

11. A device according to claim 8, further comprising a sleeve containing optical components of the lens system, the sleeve being arranged within the focussing sleeve so as to be slidingly movable for linear guiding.

12. A device according to claim 8, wherein the joint members are plastic film joints.

13. A device according to claim 8, wherein the joint members are wire joints.

14. A device according to claim 8, wherein ends of the bending actuators lying opposite the free ends are fastened in an outer part fixing a head of the camera.

15. A focussing and focal length adjusting device for an optical lens system in an endoscopic video camera, comprising:

a drive device for a focusing lens of the lens system;

at least one piezoelectric actuator for moving the drive device;

an automatic focussing circuit for producing a focus adjusting signal which can be supplied to the at least one piezoelectric actuator;

an electromotoric zoom drive connected to a zoom objective of the optical lens system, the zoom drive comprising a stepper motor, the zoom objective being encompassed by a zoom sleeve linearly guided in an outer sleeve fixed in a head of the camera, the zoom sleeve comprising a radially projecting pin engaging through an axial longitudinal slot of the outer sleeve, said pin engaging with low play and low friction into a helical groove of a grooved roller sitting in an axial extension of a motor shaft of the stepper motor so that rotational movement of the motor shaft is converted into an axial movement of the zoom sleeve, the helical groove of the grooved roller having a length that corresponds to the zoom adjusting path; and a zoom control circuit which with a manually inputted zoom signal produces a focal length adjusting signal which can activate the stepper motor during each vertical blanking interval by one of a single step and half a step, wherein from a vertical synchronous impulse ($V_{Sync}$), obtained as a direct signal from camera electronics or extracted from a video signal by way of an extraction circuit, a time window is produced which is supplied to the focussing circuit and the zoom control circuit, the focussing circuit sending the focus adjusting signal to the piezoelectric actuator of the drive device and the zoom control circuit, and the focal length adjusting signal to the zoom drive only within a vertical blanking interval provided by the time window.

16. A device according to claim 15, wherein the zoom control circuit is operative to activate the stepper motor in the half-step mode.

17. A device according to claim 16, wherein a half step of the stepper motor corresponds to an angle increment of 9°.

18. A device according to claim 15, wherein the grooved roller consists of one of plastic and light metal.

19. A device according to claim 15, wherein the voltage generator is an electronic potentiometer.

20. A device according to claim 19, wherein the focusing circuit comprises a microprocessor which produces the input signal for the electronic potentiometer as a multi-bit signal.

21. A device according to claim 15, further comprising a sleeve containing optical components of the lens system, the sleeve being arranged within the focussing sleeve so as to be slidingly movable for linear guiding.

22. A device according to claim 15, wherein the joint members are plastic film joints.

23. A device according to claim 15, wherein the joint members are wire joints.

24. A device according to claim 15, wherein ends of the bending actuators lying opposite the free ends are fastened in an outer part fixing a head of the camera.

* * * * *